US009538066B2

(12) United States Patent
Zheng

(10) Patent No.: US 9,538,066 B2
(45) Date of Patent: Jan. 3, 2017

(54) INFORMATION PROCESSING METHOD AND ELECTRONIC DEVICE

(71) Applicants: BEIJING LENOVO SOFTWARE LTD., Beijing (CN); LENOVO (BEIJING) LIMITED, Beijing (CN)

(72) Inventor: Qizhong Zheng, Beijing (CN)

(73) Assignees: LENOVO (BEIJING) LIMITED, Beijing (CN); BEIJING LENOVO SOFTWARE LTD., Beijing (CN)

(*) Notice: Subject to any disclaimer, the term of this patent is extended or adjusted under 35 U.S.C. 154(b) by 0 days.

(21) Appl. No.: 14/499,866

(22) Filed: Sep. 29, 2014

(65) Prior Publication Data

US 2015/0249783 A1 Sep. 3, 2015

(30) Foreign Application Priority Data

Mar. 3, 2014 (CN) .......................... 2014 1 0074800

(51) Int. Cl.
| *H04N 5/232* | (2006.01) |
|---|---|
| *G03B 13/36* | (2006.01) |
| *G02B 7/36* | (2006.01) |
| *G02B 7/28* | (2006.01) |
| *G02B 7/04* | (2006.01) |

(52) U.S. Cl.
CPC ............ *H04N 5/23212* (2013.01); *G02B 7/04* (2013.01); *G02B 7/28* (2013.01); *G03B 13/36* (2013.01)

(58) Field of Classification Search
CPC .. H04N 5/23212; H04N 5/2356; G03B 13/36; G02B 7/09; G02B 7/102; G02B 7/28–7/40
See application file for complete search history.

(56) References Cited

U.S. PATENT DOCUMENTS

| 6,430,368 | B1 * | 8/2002 | Hata | ................... | H04N 5/23212 |
|---|---|---|---|---|---|
| | | | | | 348/E5.045 |
| 2003/0160886 | A1 * | 8/2003 | Misawa | ............... | H04N 5/2253 |
| | | | | | 348/347 |
| 2007/0064141 | A1 * | 3/2007 | Misawa | ............... | H04N 5/2253 |
| | | | | | 348/333.01 |
| 2011/0150446 | A1 * | 6/2011 | Song | ................... | H04N 5/23212 |
| | | | | | 396/90 |
| 2011/0277462 | A1 * | 11/2011 | Gregory | ............... | H04N 5/2257 |
| | | | | | 60/527 |

* cited by examiner

*Primary Examiner* — Jason Flohre
(74) *Attorney, Agent, or Firm* — Scully Scott Murphy & Presser

(57) ABSTRACT

An information processing method and an electronic device are provided. The method includes: controlling a first lens of a first image acquisition unit to move from a first position in a first direction, and controlling a second lens of a second image acquisition unit to move from the first position in a second direction opposite to the first direction; obtaining at least one first focus value in a first focus area corresponding to the first image acquisition unit during said moving in the first direction, and obtaining at least one second focus value in a second focus area corresponding to the second image acquisition unit during said moving in the second direction; performing a first calculation on the at least one first focus value and the at least one second focus value to obtain a third focus value; and controlling the first and second image acquisition units to implement focusing based on the third focus value.

8 Claims, 3 Drawing Sheets

- - Prior Art - -

Position of a focal plane of a lens

- - Prior Art - -

Position of a focal plane of a lens

- - Prior Art - -

INFORMATION PROCESSING METHOD AND ELECTRONIC DEVICE

TECHNICAL FIELD

The disclosure relates to electronic technologies, and more particularly, to information processing method and electronic device.

BACKGROUND

In 1939, Daguerre in France invented the first camera in the world, it dramatically changed the way to record people's life. With the development of electron-optical technology, photos taken for landscape, portrait and animal evolve from black-and-white to colorized and become more clear and vivid.

According to one technique, an active focusing approach is disclosed, which is primary used for traditional camera. According to another technique, a passive focusing approach is disclosed, which is popular for mobile phones and tablets. Furthermore, there are three approaches for a contrast detection method in passive focusing.

The first approach is a global ramping algorithm as shown in FIG. 1, in which focus values are compared one by one and a maximum focus value is determined after all the focus values have been compared, so as to drive a focus motor to implement focusing. The second approach is a fast ramping algorithm as shown in FIG. 2, in which once a maximum value is obtained through comparison, i.e., a current focus value is smaller than a previous focus value, a maximum focus value is obtained, and the comparison will no longer continue. The third approach is a global stepwise ramping algorithm as shown in FIG. 3, in which a ramping algorithm is executed respectively in steps based on Depth of Field (DOF), a representative node is selected in the same range of DOF, and focus values of various representative nodes are compared to obtain a maximum focus value.

However, the calculation time is long and the calculation speed is low for the above three focusing manners, which is difficult to meet users' requirements on quick focusing. Therefore, the time required to focus using the contrast detection method is long.

SUMMARY

In an aspect, the present disclosure provides an information processing method applied to an electronic device comprising a first image acquisition unit and a second image acquisition unit, the method comprising:

controlling a first lens of the first image acquisition unit to move from a first position in a first direction, and controlling a second lens of the second image acquisition unit to move from the first position in a second direction opposite to the first direction;

obtaining at least one first focus value in a first focus area corresponding to the first image acquisition unit during said moving in the first direction, and obtaining at least one second focus value in a second focus area corresponding to the second image acquisition unit during said moving in the second direction;

performing a first calculation on the at least one first focus value and the at least one second focus value to obtain a third focus value; and controlling the first and second image acquisition units to implement focusing based on the third focus value.

In an embodiment, the first position is a position at which the first and second lenses can be driven respectively by a first and a second driving units of the electronic device to arrive in the case that duty cycle of a driving pulse is a first duty cycle.

In an embodiment, said controlling a first lens of a first image acquisition unit to move from a first position in a first direction and controlling a second lens of a second image acquisition unit to move from the first position in a second direction opposite to the first direction further comprises:

controlling the driving pulse to change from the first duty cycle to a second duty cycle different from the first duty cycle, so as to control the first lens to move from the first position in the first direction; and controlling the driving pulse to change from the first duty cycle to a third duty cycle different from both the first and second duty cycles, so as to control the second lens to move from the first position in the second direction.

In an embodiment, said obtaining at least one first focus value in a first focus area corresponding to the first image acquisition unit during said moving in the first direction and obtaining at least one second focus value in a second focus area corresponding to the second image acquisition unit during said moving in the second direction further comprises:

obtaining first pixel values in the first focus area and obtaining first gradient information based on the first pixel values;

obtaining the at least one first focus value by performing a global ramping algorithm, a fast ramping algorithm or a global stepwise ramping algorithm on the first gradient information;

obtaining second pixel values in the second focus area and obtaining second gradient information based on the second pixel values; and obtaining the at least one second focus value by performing the global ramping algorithm, the fast ramping algorithm or the global stepwise ramping algorithm on the second gradient information.

In an embodiment, said performing a first calculation on the at least one first focus value and the at least one second focus value to obtain a third focus value further comprises:

comparing each focus value of the at least one first focus value with each focus value of the at least one second focus value to obtain a maximum focus value; and determining the obtained maximum focus value as the third focus value.

In an embodiment, said controlling the first and second image acquisition units to implement focusing based on the third focus value further comprises:

obtaining a fourth duty cycle based on the third focus value; and the first driving unit driving the first lens to move to a second position corresponding to the third focus value based on the fourth duty cycle, so that the first image acquisition unit implements focusing; and the second driving unit driving the second lens to move to the second position corresponding to the third focus value based on the fourth duty cycle, so that the second image acquisition unit implements focusing.

In another aspect, the present disclosure provides an electronic device, comprising:

a first image acquisition unit;

a second image acquisition unit;

a first control unit configured to control a first lens of the first image acquisition unit to move from a first position in a first direction, and control a second lens of the second image acquisition unit to move from the first position in a second direction opposite to the first direction;

a focus value obtaining unit configured to obtain at least one first focus value in a first focus area corresponding to the first image acquisition unit during said moving in the first direction, and obtain at least one second focus value in a second focus area corresponding to the second image acquisition unit during said moving in the second direction;

a processing unit configured to perform a first calculation on the at least one first focus value and the at least one second focus value to obtain a third focus value; and a second control unit configured to control the first and second image acquisition units to implement focusing based on the third focus value.

In an embodiment, the first position is a position at which the first and second lenses can be driven respectively by a first and a second driving units of the electronic device, respectively, to arrive in the case that a duty cycle of a driving pulse is a first duty cycle.

In an embodiment, the first control unit is further configured to:

control the driving pulse to change from the first duty cycle to a second duty cycle different from the first duty cycle, so as to control the first lens to move from the first position in the first direction; and control the driving pulse to change from the first duty cycle to a third duty cycle different from both the first and second duty cycles, so as to control the second lens to move from the first position in the second direction.

In an embodiment, the focus value obtaining unit is further configured to:

obtain first pixel values in the first focus area and obtain first gradient information based on the first pixel values;

obtain the at least one first focus value by performing a global ramping algorithm, a fast ramping algorithm or a global stepwise ramping algorithm on the first gradient information;

obtain second pixel values in the second focus area and obtain second gradient information based on the second pixel values; and obtain the at least one second focus value by performing the global ramping algorithm, the fast ramping algorithm or the global stepwise ramping algorithm on the second gradient information.

In an embodiment, the processing unit is further configured to:

compare each focus value of the at least one first focus value with each focus value of the at least one second focus value to obtain a maximum focus value; and determine the obtained maximum focus value as the third focus value.

In an embodiment, the second control unit is further configured to:

obtain a fourth duty cycle based on the third focus value; and control the first driving unit to drive the first lens to move to a second position corresponding to the third focus value based on the fourth duty cycle, so that the first image acquisition unit implements focusing; and control the second driving unit to drive the second lens to move to the second position corresponding to the third focus value based on the fourth duty cycle, so that the second image acquisition unit implements focusing.

The above technical solutions according to the embodiments of the present disclosure provide at least the following technical effects or advantages.

DETAILED DESCRIPTION OF THE EMBODIMENTS

Figure 1:
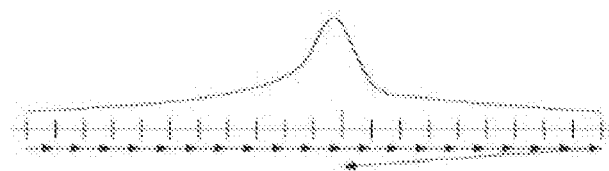
FIG. 1 is a schematic diagram of a global ramping algorithm.
Figure 2:
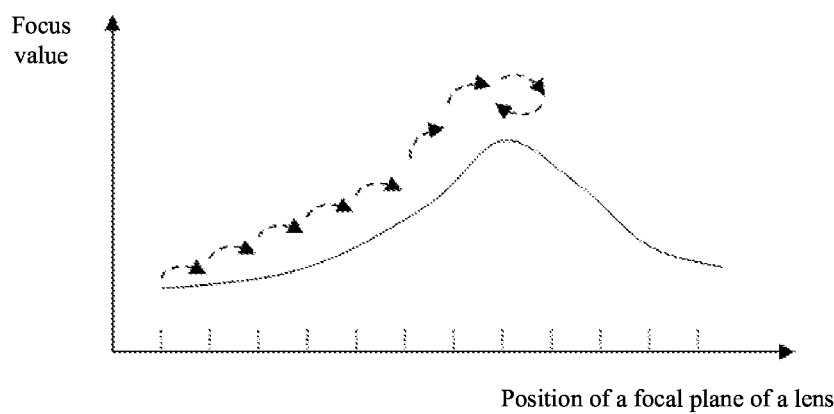
FIG. 2 is a schematic diagram of a fast ramping algorithm.
Figure 3:
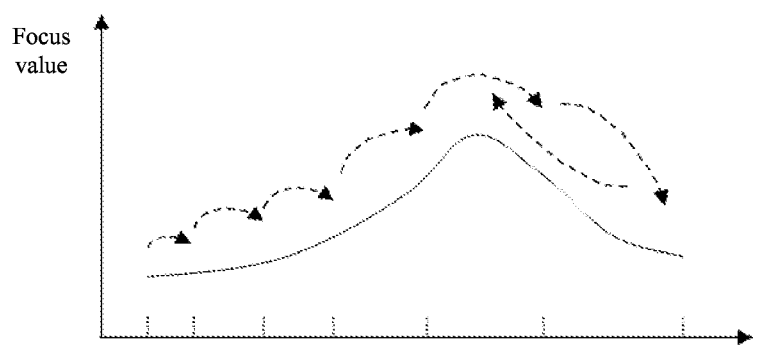
FIG. 3 is a schematic diagram of a global stepwise ramping algorithm.
Figure 4:
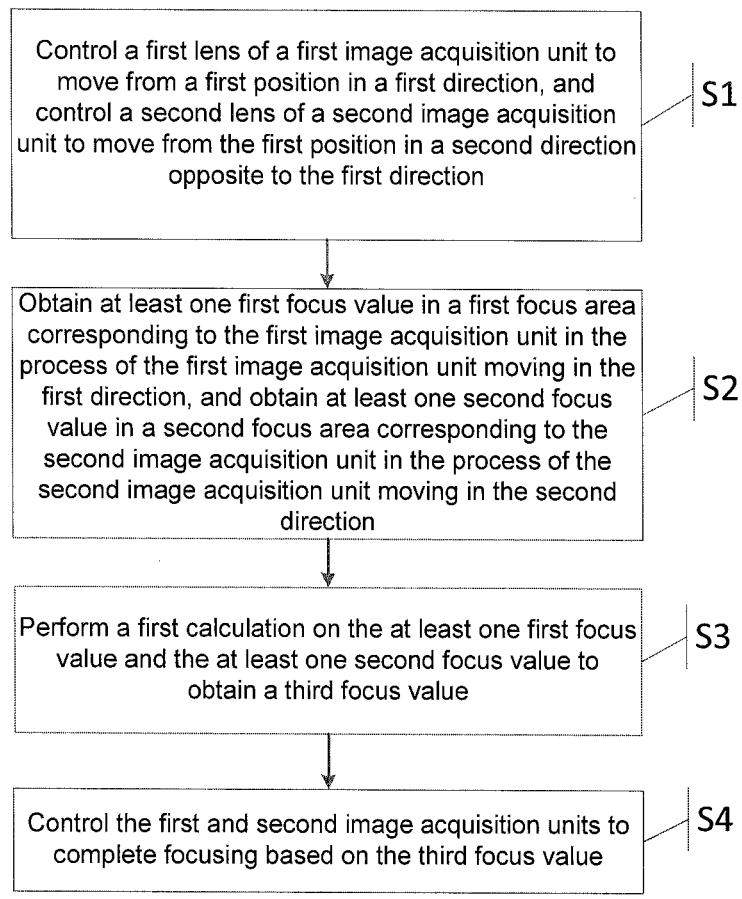
FIG. 4 is a flowchart of an information processing method according to a first embodiment of the present disclosure.

Information processing methods and electronic devices according to the embodiments of the present disclosure solve the technical problems with the conventional solutions that the time required to focus using the contrast detection method is long, and achieves the technical effects of reducing the focus time by half.

In view of the above technical problem, the general concept of the technical solutions according to the embodiments of the present disclosure is described as follows:

controlling a first lens of a first image acquisition unit to move from a first position in a first direction, and controlling a second lens of a second image acquisition unit to move from the first position in a second direction opposite to the first direction;

obtaining at least one first focus value in a first focus area corresponding to the first image acquisition unit when the first image acquisition unit moves in the first direction, and obtaining at least one second focus value in a second focus area corresponding to the second image acquisition unit when the second image acquisition unit moves in the second direction;

performing a first calculation on the at least one first focus value and the at least one second focus value to obtain a third focus value; and controlling the first and second image acquisition units to implement focusing based on the third focus value.

With the technical solutions of the disclosure, firstly a first lens of a first image acquisition unit is controlled to move from a first position in a first direction, and a second lens of a second image acquisition unit is controlled to move from the first position in a second direction opposite to the first direction; then at least one first focus value in a first focus area corresponding to the first image acquisition unit is obtained when the first image acquisition unit moves in the first direction, and at least one second focus value in a second focus area corresponding to the second image acquisition unit is obtained when the second image acquisition unit moves in the second direction; further a first calculation is performed on the at least one first focus value and the at least one second focus value to obtain a third focus value; and finally the first and second image acquisition units are controlled to implement focusing based on the third focus value. This solves the technical problems with the conventional solutions that the time required to focus using the contrast detection method is long, and achieves the technical effects of implementing quick focusing by controlling two image acquisition units to move in two opposite directions at the same time.

The technical solutions of the present disclosure will be described in detail below in conjunction with accompanying drawings and specific embodiments. It should be understood that the embodiments of the present disclosure and specific features in the embodiments are indented to specifically describe the technical solutions of the present disclosure, instead of limiting the technical solutions of the present disclosure. The embodiments of the present disclosure and technical features in the embodiments can be combined with each other without conflict.

In the embodiments of the present disclosure, information processing methods and electronic devices are provided. In a specific implementation, the electronic device may be a smart phone, a tablet or a digital single lens reflex, as long as it has an image acquisition unit. The present disclosure is not limited thereto. The information processing methods and electronic devices according to the embodiments of the present disclosure will be described in detail below by taking a camera as an example.

First Embodiment

Figure 8:
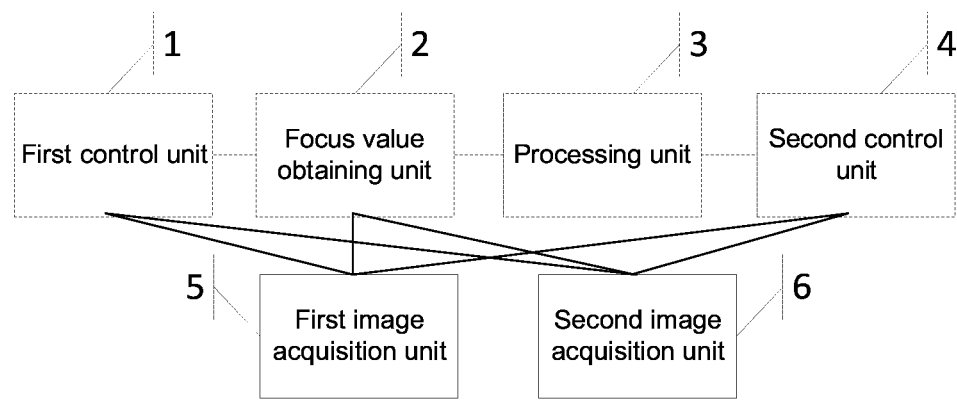
FIG. 8 is a structural diagram of an electronic device according to a second embodiment of the present disclosure.

Before describing the information processing methods according to the embodiment of the present disclosure, a basic structure of an electronic device in which the methods according to the embodiment of the present disclosure are applied will be described. With reference to FIG. 8, the electronic device according to an embodiment of the present disclosure includes:

a first control unit 1 configured to control a first lens of a first image acquisition unit 5 to move from a first position in a first direction, and control a second lens of a second image acquisition unit 6 to move from the first position in a second direction opposite to the first direction;

a focus value obtaining unit 2 configured to obtain at least one first focus value in a first focus area corresponding to the first image acquisition unit when the first image acquisition unit 5 moves in the first direction, and obtain at least one second focus value in a second focus area corresponding to the second image acquisition unit 6 when the second image acquisition unit moves in the second direction;

a processing unit 3 configured to perform a first calculation on the at least one first focus value and the at least one second focus value to obtain a third focus value; and a second control unit 4 configured to control the first and second image acquisition units 5 and 6 to implement focusing based on the third focus value.

A first information processing method of the present disclosure will be described in detail below with reference to FIG. 1.

S1: controlling a first lens of a first image acquisition unit to move from a first position in a first direction, and controlling a second lens of a second image acquisition unit to move from the first position in a second direction opposite to the first direction.

In order to implement quick focusing, in the embodiment of the present disclosure, two image acquisition units exist in the electronic device, and have the same angle of view, thereby being capable of focusing on the same point.

In the embodiment of the present disclosure, the first position is a position at which the first and second lenses can be driven respectively by first and second driving units in the electronic device to arrive when a duty cycle of a driving pulse is a first duty cycle.

Specifically, the focusing process refers to a focus motor driving a lens of an image acquisition unit to move thereby obtaining a preview image. Driving the lens to move is achieved by a change in the driving pulse. Therefore, in the embodiment of the present disclosure, when a duty cycle of the driving pulse is the first duty cycle, the position at which the first and second lenses can arrive is the first position.

Controlling a first lens of a first image acquisition unit to move from a first position in a first direction and controlling a second lens of a second image acquisition unit to move from the first position in a second direction opposite to the first direction in step S1 further includes:

controlling the driving pulse to change from the first duty cycle to a second duty cycle different from the first duty cycle, so as to control the first lens to move from the first position in the first direction; and controlling the driving pulse to change from the first duty cycle to a third duty cycle different from both the first and second duty cycles, so as to control the second lens to move from the first position in the second direction.

As the duty cycle of the driving pulse changes, the focus motor can drive the lens to move. Therefore, in order to implement quick focusing, in the embodiment of the present application, the duty cycle of the driving pulse is controlled to change from the first duty cycle to a second duty cycle and a third duty cycle respectively at the same time, and the first duty cycle is different from the second and third duty cycle, so that the lenses of the two image acquisition units can be controlled to move at the same time.

Further, assume that the first duty cycle is q1, the second duty cycle is q2, and the third duty cycle is q3. In order to ensure that the first lens and the second lens can move in different directions, a condition that $0 \leq q2 < q1 < q3 \leq 100\%$ or $0 \leq q3 < q1 < q2 \leq 100\%$ should be met.

Preferably, in order to ensure sufficient time for the first image acquisition unit and the second image acquisition unit, $q1=50\%$, $q2=0$ and $q3=100\%$, or $q1=50\%$, $q2=100\%$ and $q3=0$ may be set. In this way, the first lens and the second lens move from a central position in a forward direction or in a backward direction to obtain preview images. The duty cycles may be set as other values, such as $q1=50\%$, $q2=30\%$ and $q3=70\%$, or $q1=50\%$, $q2=67\%$ and $q3=33\%$. The specific values of the duty cycles can be selected by those skilled in the art according to practical requirements, and are not limited in the present disclosure.

S2: obtaining at least one first focus value in a first focus area corresponding to the first image acquisition unit in the process of the first image acquisition unit moving in the first direction, and obtaining at least one second focus value in a second focus area corresponding to the second image acquisition unit in the process of the second image acquisition unit moving in the second direction.

In the process of moving, preview images and thus at least one first focus value and at least one second focus value are obtained. The process of obtaining the at least one first focus value and the at least one second focus value includes:

obtaining first pixel values in the first focus area and obtaining first gradient information based on the first pixel values;

obtaining the at least one first focus value by performing a global ramping algorithm, a fast ramping algorithm or a global stepwise ramping algorithm on the first gradient information;

obtaining second pixel values in the second focus area and obtaining second gradient information based on the second pixel values; and obtaining the at least one second focus value by performing the global ramping algorithm, the fast ramping algorithm or the global stepwise ramping algorithm on the second gradient information.

Specifically, in the process of focusing by the first image acquisition unit, first pixel values in the first focus area are firstly obtained. The first pixel values are pixel values of all pixel points in the focus area and are between 0 and 255. The first gradient information can be obtained by calculating a contrast between adjacent pixel points and a contrast difference.

Further, at least one focus value is obtained by performing a global ramping algorithm, a fast ramping algorithm or a global stepwise ramping algorithm on the first gradient information. The process of obtaining the first focus value using the global ramping algorithm, the fast ramping algorithm or the global stepwise ramping algorithm will be described in detail below.

First Approach: Global Ramping Algorithm

Figure 5:
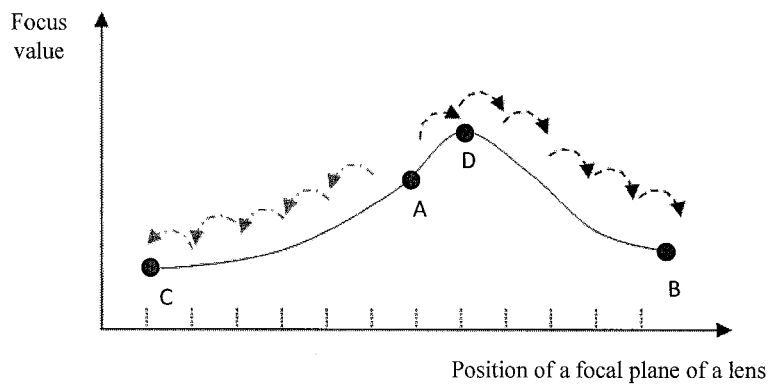
FIG. 5 is a schematic diagram of a global ramping algorithm according to the first embodiment of the present disclosure.

As shown in FIG. 5, it is assumed that a focus value corresponding to a first position is at point A in FIG. 5, and a first direction is a direction in which a focal plane becomes larger. Firstly, in the global ramping algorithm, the first duty cycle q1 changes based on a frame rate of the electronic device. If the frame rate is 50 fps, when q1=50%, the first lens will be driven to move once every 1% during the change from q1 to q2, to obtain a frame of preview image. In this way, a total of 50 frames of preview images are obtained. The first image unit performs the ramping algorithm from the point A. It is assumed that q2=100% and the duty cycle of 100% corresponds to point B in FIG. 5. The first gradient information is calculated as the duty cycle changes, to obtain at least one focus value until the point B is reached.

With respect to the process of obtaining at least one second focus value, it is assumed that q3=0 corresponds to point C. The process of obtaining the at least one second focus value based on the second gradient information is the same as the process of obtaining the first focus value, and therefore the description thereof will be omitted here.

Second Approach: Fast Ramping Algorithm

Figure 6:
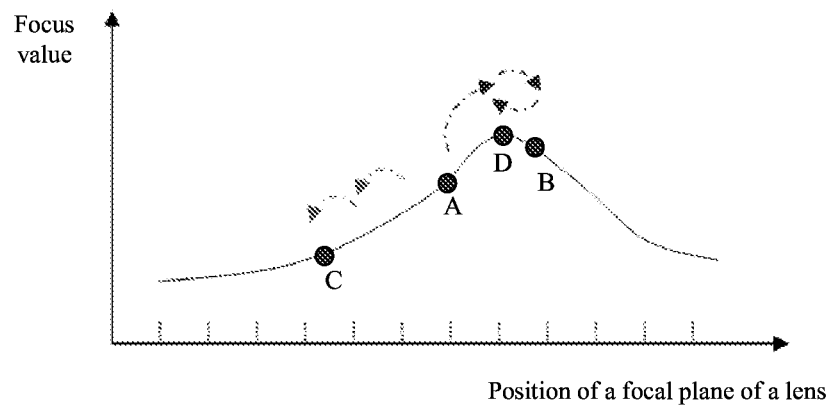
FIG. 6 is a schematic diagram of a fast ramping algorithm according to the first embodiment of the present disclosure.

As shown in FIG. 6, it is assumed that a focus value corresponding to a first position is at point A in FIG. 6, and a first direction is a direction in which a focal plane becomes larger. Firstly, in the fast ramping algorithm, the first duty cycle q1 changes based on a frame rate of the electronic device. If the frame rate is 50 fps, when q1=50%, the first lens will be driven to move once every 1% during the change from q1 to q2, to obtain a frame of preview image. In this way, a total of 50 frames of preview images are obtained. The first image unit performs the ramping algorithm from the point A. It is assumed that q2=85% and the duty cycle of 85% corresponds to point B in FIG. 6. The first gradient information is calculated as the duty cycle changes, to obtain at least one focus value until the point B is reached.

With respect to the process of obtaining at least one second focus value, it is assumed that q3=15% corresponds to point C. The process of obtaining the at least one second focus value based on the second gradient information is the same as the process of obtaining the first focus value, and therefore the description thereof will be omitted here.

Third Approach: Global Stepwise Ramping Algorithm

Figure 7:
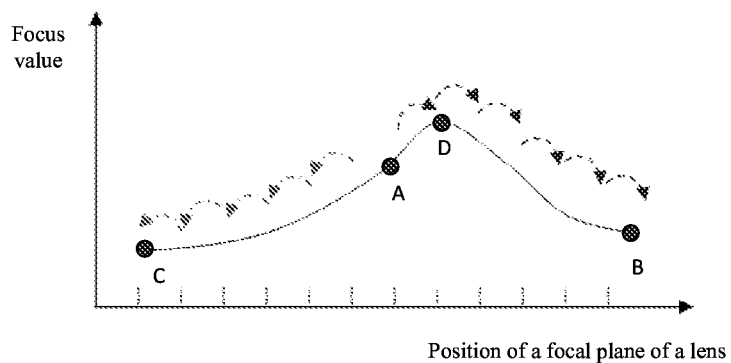
FIG. 7 is a schematic diagram of a global stepwise ramping algorithm according to the first embodiment of the present disclosure.

As shown in FIG. 7, it is assumed that a focus value corresponding to a first position is at point A in FIG. 7, and a first direction is a direction in which a focal plane becomes larger. Firstly, in the global ramping algorithm, the first duty cycle q1 changes based on depth of field (DOF) of the electronic device. If the DOF is 4.94 m~5.062 m, the duty cycle may change among 10 values. When q1=50%, the first lens will be driven to move once every 5% during the change from q1 to q2, to obtain a frame of preview image. In this way, a total of 10 frames of preview images are obtained. The first image unit performs the ramping algorithm from the point A. It is assumed that q2=100% and the duty cycle of 100% corresponds to point B in FIG. 7. The first gradient information is calculated as the duty cycle changes, to obtain at least one focus value until the point B is reached.

With respect to the process of obtaining at least one second focus value, it is assumed that q3=0% corresponds to point C. The process of obtaining the at least one second focus value based on the second gradient information is the same as the process of obtaining the first focus value, and therefore the description thereof will be omitted here.

S3: performing a first calculation on the at least one first focus value and the at least one second focus value to obtain a third focus value.

After obtaining the at least one first focus value and the at least one second focus value, a third focus value can be obtained by performing a first calculation, which further includes:

comparing each focus value of the at least one first focus value with each focus value of the at least one second focus value to obtain a maximum focus value; and determining the obtained maximum focus value as the third focus value.

Specifically, in the embodiment of the present disclosure, when different algorithms are performed, the approaches for obtaining the third focus value are different. The approaches for obtaining the third focus value using three algorithms will be described below.

First Approach: Global Ramping Algorithm

When the global ramping algorithm is performed, as the first image acquisition unit obtains at least one first focus value in the process of the driving pulse changing from the first duty cycle to the second duty cycle and the second image acquisition unit obtains at least one second focus value in the process of the driving pulse changing from the first duty cycle to the third duty cycle, by comparing the at least one first focus value with the at least one second focus value, a maximum focus value is obtained as the third focus value. In an example, if the at least one first focus value is 1.4, 1.2, 1.1 and 1 and the at least second focus value is 1.5, 1.6, 1.5 and 1.4, the maximum value is 1.6, and thus the third focus value is 1.6, which is assumed to be at point D in FIG. 5.

Second Approach: Fast Ramping Algorithm

As the searching process will no longer be performed after the maximum value is obtained in the fast ramping algorithm, once the maximum value is obtained by comparing the at least one first focus value obtained by the first image acquisition unit with the at least one second focus value obtained by the second image acquisition unit, the searching process will no longer be performed. In an example, if the at least one focus value is 1.4, 1.2, 1.1, 1 and 0.8 and the at least one second focus value is 1.6, 1.7, 1.8, 1.95 and 1.8, it is evident that the at least one first focus value increasingly decreases, and a focus value of 1.8 is smaller than a previous focus value of 1.95 in the at least one second focus value. Therefore, the maximum value is 1.95, and thus the third focus value is 1.95, which is assumed to be at point D in FIG. 6. After the maximum value is found, the first image acquisition unit and the second image acquisition unit will no longer obtain focus values.

Third Manner: Global Stepwise Ramping Algorithm

When the global stepwise ramping algorithm is performed, as the first image acquisition unit obtains at least one first focus value in the process of the driving pulse changing from the first duty cycle to the second duty cycle and the second image acquisition unit obtains at least one second focus value in the process of the driving pulse changing from the first duty cycle to the third duty cycle, by comparing the at least one first focus value with the at least one second focus value, a maximum focus value is obtained as the third focus value. In an example, if at least one first focus value of representative nodes in various segments are 1.4, 1.2, 1.1 and 1 and at least one second focus value of representative nodes in various segments are 1.5, 1.6, 1.5 and 1.4, the maximum value is 1.6 and thus the third focus value is 1.6, which is assumed to be at point D in FIG. 7.

S4: controlling the first and second image acquisition units to implement focusing based on the third focus value.

After the third focus value is obtained, focusing can be implemented based on the third focus value, which further includes:

obtaining a fourth duty cycle based on the third focus value; and the first driving unit driving the first lens to move to a second position corresponding to the third focus value based on the fourth duty cycle, so that the first image acquisition unit implements focusing; and the second driving unit driving the second lens to move to the second position corresponding to the third focus value based on the fourth duty cycle, so that the second image acquisition unit implements focusing.

Specifically, after the third focus value is obtained, a fourth duty cycle corresponding to the third focus value can be obtained, such as 13%, 58%, 46% or 16%. Further, after the fourth duty cycle is obtained, a duty cycle of the driving pulse is adjusted to the fourth duty cycle, and then the driving pulse can drive the first lens and the second lens to a second position corresponding to the fourth duty is cycle, which is a focal position.

Further, in order to implement focusing more accurately, after the above solution is implemented once, it can further be implemented once again within a smaller range. In this way, focusing can be implemented more accurately. The first focusing is equivalent to a coarse focusing, and the second focusing is equivalent to a fine focusing.

Therefore, in the technical solutions of the present disclosure, as focusing is implemented at the same time by using two image acquisition units, when a maximum focus value is searched, a ramping algorithm can be performed from a point in two opposite directions at the same time, thereby reducing the focus time by half.

Second Embodiment

With reference to FIG. 8, the second embodiment of the present disclosure provides an electronic device having two image acquisition units 5 and 6, further including:

a first control unit 1 configured to control a first lens of a first image acquisition unit 5 to move from a first position in a first direction, and control a second lens of a second image acquisition unit 6 to move from the first position in a second direction opposite to the first direction;

a focus value obtaining unit 2 configured to obtain at least one first focus value in a first focus area corresponding to the first image acquisition unit 5 when the first image acquisition unit 5 moves in the first direction, and obtain at least one second focus value in a second focus area corresponding to the second image acquisition unit 6 when the second image acquisition unit 6 moves in the second direction;

a processing unit 3 configured to perform a first calculation on the at least one first focus value and the at least one second focus value to obtain a third focus value; and a second control unit 4 configured to control the first and second image acquisition units 5 and 6 to implement focusing based on the third focus value.

Specifically, in the embodiment of the present disclosure, the first position is a position at which the first and second lenses can be driven respectively by first and second driving units in the electronic device to arrive when a duty cycle of a driving pulse is a first duty cycle.

Further, the first control unit 1 is further configured to:

control the driving pulse to change from the first duty cycle to a second duty cycle different from the first duty cycle, so as to control the first lens to move from the first position in the first direction; and control the driving pulse to change from the first duty cycle to a third duty cycle different from both the first and second duty cycles, so as to control the second lens to move from the first position in the second direction.

The focus value obtaining unit 2 is further configured to:

obtain first pixel values in the first focus area and obtain first gradient information based on the first pixel values;

obtain the at least one first focus value by performing a global ramping algorithm, a fast ramping algorithm or a global stepwise ramping algorithm on the first gradient information;

obtain second pixel values in the second focus area and obtain second gradient information based on the second pixel values; and obtain the at least one second focus value by performing the global ramping algorithm, the fast ramping algorithm or the global stepwise ramping algorithm on the second gradient information.

The processing unit 3 is further configured to:

compare each focus value of the at least one first focus value with each focus value of the at least one second focus value to obtain a maximum focus value; and determine the obtained maximum focus value as the third focus value.

The second control unit 4 is further configured to:

obtain a fourth duty cycle based on the third focus value; and control the first driving unit to drive the first lens to move to a second position corresponding to the third focus value based on the fourth duty cycle, so that the first image acquisition unit implements focusing; and control the second driving unit to drive the second lens to move to the second position corresponding to the third focus value based on the fourth duty cycle, so that the second image acquisition unit implements focusing.

The second embodiment and the first embodiment are based on the same general inventive concept. Therefore, the repeated description will be omitted here.

The above technical solutions according to the embodiments of the present disclosure provide at least the following technical effects or advantages.

With the technical solutions according to the embodiments of the disclosure, firstly a first lens of a first image acquisition unit is controlled to move from a first position in a first direction, and a second lens of a second image acquisition unit is controlled to move from the first position in a second direction opposite to the first direction; then at least one first focus value in a first focus area corresponding to the first image acquisition unit is obtained in the process of the first image acquisition unit moving in the first direction, and at least one second focus value in a second focus area corresponding to the second image acquisition unit is obtained in the process of the second image acquisition unit moving in the second direction; further a first calculation is performed on the at least one first focus value and the at least one second focus value to obtain a third focus value; and finally the first and second image acquisition units are controlled to implement focusing based on the third focus value. This solves the technical problems with the conventional solutions that the time required to focus using the contrast detection method is long, and achieves the technical effects of implementing quick focusing by controlling two image acquisition units to move in two opposite directions at the same time.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, computer program instructions corresponding to the two information processing methods according to the embodiments of the present disclosure may be stored on a storage medium such as an optical disk, a hard disk, a USB device etc. When the computer program instructions in the storage medium corresponding to the information processing method are read or executed by an electronic device, the following steps are performed:

controlling a first lens of a first image acquisition unit to move from a first position in a first direction, and controlling a second lens of a second image acquisition unit to move from the first position in a second direction opposite to the first direction;

obtaining at least one first focus value in a first focus area corresponding to the first image acquisition unit during said moving in the first direction, and obtaining at least one second focus value in a second focus area corresponding to the second image acquisition unit during said moving in the second direction;

performing a first calculation on the at least one first focus value and the at least one second focus value to obtain a third focus value; and controlling the first and second image acquisition units to implement focusing based on the third focus value.

Alternatively, the first position is a position at which the first and second lenses can be driven respectively by first and second driving units in the electronic device to arrive when a duty cycle of a driving pulse is a first duty cycle.

Alternatively, when computer instructions stored in the storage medium, which correspond to the step of controlling a first lens of a first image acquisition unit to move from a first position in a first direction and controlling a second lens of a second image acquisition unit to move from the first position in a second direction opposite to the first direction, are executed, the following steps are further performed:

controlling the driving pulse to change from the first duty cycle to a second duty cycle different from the first duty cycle, so as to control the first lens to move from the first position in the first direction; and controlling the driving pulse to change from the first duty cycle to a third duty cycle different from both the first and second duty cycles, so as to control the second lens to move from the first position in the second direction.

Alternatively, when computer instructions stored in the storage medium, which correspond to the step of obtaining at least one first focus value in a first focus area corresponding to the first image acquisition unit in the process of the first image acquisition unit moving in the first direction and obtaining at least one second focus value in a second focus area corresponding to the second image acquisition unit in the process of the second image acquisition unit moving in the second direction, are executed, the following steps are further performed:

obtaining first pixel values in the first focus area and obtaining first gradient information based on the first pixel values;

obtaining the at least one first focus value by performing a global ramping algorithm, a fast ramping algorithm or a global stepwise ramping algorithm on the first gradient information;

obtaining second pixel values in the second focus area and obtaining second gradient information based on the second pixel values; and obtaining the at least one second focus value by performing the global ramping algorithm, the fast ramping algorithm or the global stepwise ramping algorithm on the second gradient information.

Alternatively, when computer instructions stored in the storage medium, which correspond to the step of performing a first calculation on the at least one first focus value and the at least one second focus value to obtain a third focus value, are executed, the following steps are further performed:

comparing each focus value of the at least one first focus value with each focus value of the at least one second focus value to obtain a maximum focus value; and determining the obtained maximum focus value as the third focus value.

Alternatively, when computer instructions stored in the storage medium, which correspond to the step of controlling the first and second image acquisition units to implement focusing based on the third focus value, are executed, the following steps are further performed:

obtaining a fourth duty cycle based on the third focus value; and the first driving unit driving the first lens to move to a second position corresponding to the third focus value based on the fourth duty cycle, so that the first image acquisition unit implements focusing; and the second driving unit driving the second lens to move to the second position corresponding to the third focus value based on the fourth duty cycle, so that the second image acquisition unit implements focusing.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. An information processing method applied to an electronic device comprising a first image acquisition unit and a second image acquisition unit, the method comprising:
    a coarse focusing step comprising, in a first focusing range:
        controlling a first lens of the first image acquisition unit to move from a first position in a first direction, and controlling a second lens of the second image acquisition unit to move from the first position in a second direction opposite to the first direction;
        obtaining at least one first focus value in a first focus area corresponding to the first image acquisition unit during said moving in the first direction, and obtaining at least one second focus value in a second focus area corresponding to the second image acquisition unit during said moving in the second direction;
        performing a first calculation on the at least one first focus value and the at least one second focus value to obtain a third focus value; and
        controlling the first and second image acquisition units to implement focusing based on the third focus value by moving the first and second lenses to a second position corresponding to the third focus value; and
    a fine focusing step comprising, in a second focusing range smaller than the first focusing range:
        controlling the first lens of the first image acquisition unit to move from the second position in the first direction, and controlling the second lens of the second image acquisition unit to move from the second position in the second direction;
        obtaining at least one fourth focus value in the first focus area corresponding to the first image acquisition unit during said moving in the first direction, and obtaining at least one fifth focus value in the second focus area corresponding to the second image acquisition unit during said moving in the second direction;
        performing a second calculation on the at least one fourth focus value and the at least one fifth focus value to obtain a sixth focus value; and
        controlling the first and second image acquisition units to implement focusing based on the sixth focus value by moving the first and second lenses to a third position corresponding to the sixth focus value, wherein the first position is a position, at which the first lens and the second lens are driven respectively by a first driving unit and a second driving unit to arrive when a driving pulse has a first duty cycle,
    wherein said controlling the first lens to move from the first position in the first direction and controlling the second lens to move from the first position in the second direction opposite to the first direction further comprises:
        controlling the driving pulse to change from the first duty cycle to a second duty cycle different from the first duty cycle, so as to control the first lens to move from the first position in the first direction; and
        controlling the driving pulse to change from the first duty cycle to a third duty cycle different from both the first duty cycle and the second duty cycle, so as to control the second lens to move from the first position in the second direction, and
    wherein the first duty cycle is smaller than the second duty cycle and larger than the third duty cycle; or the first duty cycle is smaller than the third duty cycle and larger than the second duty cycle.

2. The method according to claim 1, wherein, said obtaining at least one first focus value in a first focus area corresponding to the first image acquisition unit during said moving in the first direction, and obtaining at least one second focus value in a second focus area corresponding to the second image acquisition unit during said moving in the second direction further comprises:
    obtaining first pixel values in the first focus area and obtaining first gradient information based on the first pixel values;
    obtaining the at least one first focus value by performing a global ramping algorithm, a fast ramping algorithm or a global stepwise ramping algorithm on the first gradient information;
    obtaining second pixel values in the second focus area and obtaining second gradient information based on the second pixel values; and
    obtaining the at least one second focus value by performing the global ramping algorithm, the fast ramping algorithm or the global stepwise ramping algorithm on the second gradient information.

3. The method according to claim 2, wherein, said performing a first calculation on the at least one first focus value and the at least one second focus value to obtain a third focus value further comprises:
    comparing each focus value of the at least one first focus value with each focus value of the at least one second focus value to obtain a maximum focus value; and
    determining the obtained maximum focus value as the third focus value.

4. The method according to claim 3, wherein, said controlling the first and second image acquisition units to implement focusing based on the third focus value further comprises:
    obtaining a fourth duty cycle based on the third focus value; and
    the first driving unit driving the first lens to move to a second position corresponding to the third focus value based on the fourth duty cycle, so that the first image acquisition unit implements focusing; and the second driving unit driving the second lens to move to the second position corresponding to the third focus value based on the fourth duty cycle, so that the second image acquisition unit implements focusing.

5. An electronic device, comprising:
a first image acquisition unit;
a second image acquisition unit; and
a processor configured to perform a coarse focusing operation and a fine focusing operation,
wherein in the coarse focusing operation, the processor is configured to, in a first focusing range:
  control a first lens of the first image acquisition unit to move from a first position in a first direction, and control a second lens of the second image acquisition unit to move from the first position in a second direction opposite to the first direction;
  obtain at least one first focus value in a first focus area corresponding to the first image acquisition unit during said moving in the first direction, and obtain at least one second focus value in a second focus area corresponding to the second image acquisition unit during said moving in the second direction;
  perform a first calculation on the at least one first focus value and the at least one second focus value to obtain a third focus value; and
  control the first and second image acquisition units to implement focusing based on the third focus value by moving the first and second lenses to a second position corresponding to the third focus value; and
wherein in the fine focusing operation, the processor is configured to, in a second focusing range smaller than the first focusing range:
  control the first lens of the first image acquisition unit to move from the second position in the first direction, and controlling the second lens of the second image acquisition unit to move from the second position in the second direction;
  obtain at least one fourth focus value in the first focus area corresponding to the first image acquisition unit during said moving in the first direction, and obtaining at least one fifth focus value in the second focus area corresponding to the second image acquisition unit during said moving in the second direction;
  perform a second calculation on the at least one fourth focus value and the at least one fifth focus value to obtain a sixth focus value; and
  control the first and second image acquisition units to implement focusing based on the sixth focus value by moving the first and second lenses to a third position corresponding to the sixth focus value,
wherein the first position is a position, at which the first lens and the second lens are driven respectively by a first driving unit and a second driving unit of the electronic device to arrive when a driving pulse has a first duty cycle,
wherein, when the processor is configured to control the first lens to move from the first position in the first direction and to control the second lens to move from the first position in the second direction, the processor is further configured to:
  control the driving pulse to change from the first duty cycle to a second duty cycle different from the first duty cycle, so as to control the first lens to move from the first position in, the first direction; and
  control the driving pulse to change from the first duty cycle to a third duty cycle different from both the first and second duty cycles, so as to control the second lens to move from the first position in the second direction, and
wherein the first duty cycle is smaller than the second duty cycle and larger than the third duty cycle; or the first duty cycle is smaller than the third duty cycle and larger than the second duty cycle.

6. The electronic device according to claim 5, wherein the processor is further configured to:
  obtain first pixel values in the first focus area and obtain first gradient information based on the first pixel values;
  obtain the at least one first focus value by performing a global ramping algorithm, a fast ramping algorithm or a global stepwise ramping algorithm on the first gradient information;
  obtain second pixel values in the second focus area and obtain second gradient information based on the second pixel values; and
  obtain the at least one second focus value by performing the global ramping algorithm, the fast ramping algorithm or the global stepwise ramping algorithm on the second gradient information.

7. The electronic device according to claim 6, wherein the processor is further configured to:
  compare each focus value of the at least one first focus value with each focus value of the at least one second focus value to obtain a maximum focus value; and
  determine the obtained maximum focus value as the third focus value.

8. The electronic device according to claim 7, wherein the processor is further configured to:
  obtain a fourth duty cycle based on the third focus value; and
  control the first driving unit to drive the first lens to move to a second position corresponding to the third focus value based on the fourth duty cycle, so that the first image acquisition unit implements focusing; and control the second driving unit to drive the second lens to move to the second position corresponding to the third focus value based on the fourth duty cycle, so that the second image acquisition unit implements focusing.

* * * * *